United States Patent
Pothula et al.

(10) Patent No.: US 8,681,758 B2
(45) Date of Patent: Mar. 25, 2014

(54) VIDEO CACHING IN A WIRELESS COMMUNICATION NETWORK

(75) Inventors: Avinash Pothula, Kakinada (IN); Guntur Ravindra, Mysore (IN); Suresh Chintada, Bangalore (IN)

(73) Assignee: Symbol Technologies, Inc., Holtsville, NY (US)

(*) Notice: Subject to any disclaimer, the term of this patent is extended or adjusted under 35 U.S.C. 154(b) by 699 days.

(21) Appl. No.: 12/967,454

(22) Filed: Dec. 14, 2010

(65) Prior Publication Data
US 2012/0147865 A1  Jun. 14, 2012

(51) Int. Cl.
*H04W 40/04* (2009.01)

(52) U.S. Cl.
USPC ........................................... 370/338

(58) Field of Classification Search
None
See application file for complete search history.

(56) References Cited

U.S. PATENT DOCUMENTS

| | | | |
|---|---|---|---|
| 7,324,555 B1* | 1/2008 | Chen et al. | 370/468 |
| 7,395,355 B2 | 7/2008 | Afergan et al. | |
| 7,512,591 B2 | 3/2009 | Bildhaeuser et al. | |
| 7,512,940 B2 | 3/2009 | Horvitz | |
| 7,512,943 B2 | 3/2009 | Hester et al. | |
| 7,515,872 B2 | 4/2009 | Hundscheidt et al. | |
| 8,250,211 B2* | 8/2012 | Swildens et al. | 709/225 |
| 8,370,513 B2* | 2/2013 | Kim | 709/231 |
| 2001/0044851 A1* | 11/2001 | Rothman et al. | 709/231 |
| 2002/0156979 A1* | 10/2002 | Rodriguez | 711/129 |
| 2003/0091011 A1* | 5/2003 | Roberts et al. | 370/338 |
| 2003/0145038 A1* | 7/2003 | Bin Tariq et al. | 709/202 |
| 2004/0077362 A1* | 4/2004 | Chinomi et al. | 455/456.5 |
| 2004/0255331 A1* | 12/2004 | Inoue et al. | 725/118 |
| 2005/0160137 A1* | 7/2005 | Ishikawa et al. | 709/203 |
| 2006/0209615 A1* | 9/2006 | Iwatsu | 365/230.05 |
| 2006/0253568 A1* | 11/2006 | Lin | 709/224 |
| 2006/0259607 A1* | 11/2006 | O'Neal et al. | 709/223 |
| 2007/0011260 A1* | 1/2007 | Chiu | 709/207 |
| 2007/0204003 A1* | 8/2007 | Abramson | 709/217 |
| 2008/0212534 A1* | 9/2008 | Shitama et al. | 370/331 |
| 2009/0059865 A1* | 3/2009 | Zhang et al. | 370/331 |
| 2009/0100224 A1* | 4/2009 | Wang | 711/118 |
| 2010/0185753 A1* | 7/2010 | Liu et al. | 709/219 |
| 2011/0191449 A1* | 8/2011 | Swildens et al. | 709/219 |
| 2012/0096225 A1* | 4/2012 | Khawand et al. | 711/119 |
| 2012/0151380 A1* | 6/2012 | Bishop | 715/752 |
| 2013/0054797 A1* | 2/2013 | Khasnabish | 709/224 |
| 2013/0086328 A1* | 4/2013 | Frank et al. | 711/125 |

OTHER PUBLICATIONS

Lei Gao et al—"Application Specific Data Replication for Edge Services"—May 2003—12 pages.

(Continued)

*Primary Examiner* — Asad Nawaz
*Assistant Examiner* — Parth Patel
(74) *Attorney, Agent, or Firm* — Brian M. Mancini

(57) ABSTRACT

Video caching in a wireless communication network includes determining 300 starting and ending points of a route of a mobile device and a minimum length route therebetween 302. Intermediate access points are identified 304 along the route, and these points are polled 306 for their available bandwidth and memory. A streaming capacity is defined 308 of each access point. Access points are selected 310 having an additive streaming capacity greater or equal to a size of a video file for the mobile device, and a defined number of sequential blocks of the video file are sent 312 to each access point. Each access points then downloads 314 its blocks as the mobile device traverses a service area of that access point.

15 Claims, 3 Drawing Sheets

(56) References Cited

OTHER PUBLICATIONS

Markus Hofmann et al—:Caching Techniques for Streaming Multimedia Over the Internet—Soccer 2000 Draft—11 pages.

Jiangchuan Liu et al—Proxy Cache Management for Fine-Grained Scalable Video Streaming—IEEE Infocom—2004—11 pages.

Bharadwaj Veeravalli—"Network Caching Strategies for a Shared Data Distribution for a Predefined Service Demand Sequence"—IEEE Transactions on Knowledge and Dta engineering, vol. 15, No. 6, Nov.-Dec. 2003—11 pages.

* cited by examiner

VIDEO CACHING IN A WIRELESS COMMUNICATION NETWORK

FIELD OF THE DISCLOSURE

The present invention relates generally to wireless communication networks, and more particularly to video caching in a wireless communication network.

BACKGROUND

A problem in wireless communication networks is the ability to download a large file, such as a video file, to a device that is roaming within the network. Video files in particular are delay sensitive and are susceptible to latency problems in the network along with interruptions of service when handing off between access points along the route taken by the mobile device. As a result, the viewing of a video file in a roaming device can cause a less than satisfying experience for a user of the mobile device.

One solution to this problem is to distribute the caching and downloading of the file by distributing the file or portions of a file to a list of peer file servers. However, this solution does take into account the problems of downloading the file to a roaming device. Individual requests must still be sent to each peer server to download the file or portion of the file, which must be delivered through the proper access points at the proper time. Therefore, this solution will still suffer from delay problems and possible interruption of service.

Another solution to this problem is for mobile devices to cache copies of a file among themselves, where one mobile without the file can request another mobile device to send the file. However, this solution requires a large amount of communication overhead in order for the mobile device to be able to find another mobile device that has the file. In addition, mobile devices rarely have sufficient memory to hold a large video file.

Accordingly, there is a need for a video caching technique that does not suffer from the above problems in order to provide a good video download experience. It would also be of benefit to reduce the number of server access requests in order to receive a complete video file.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
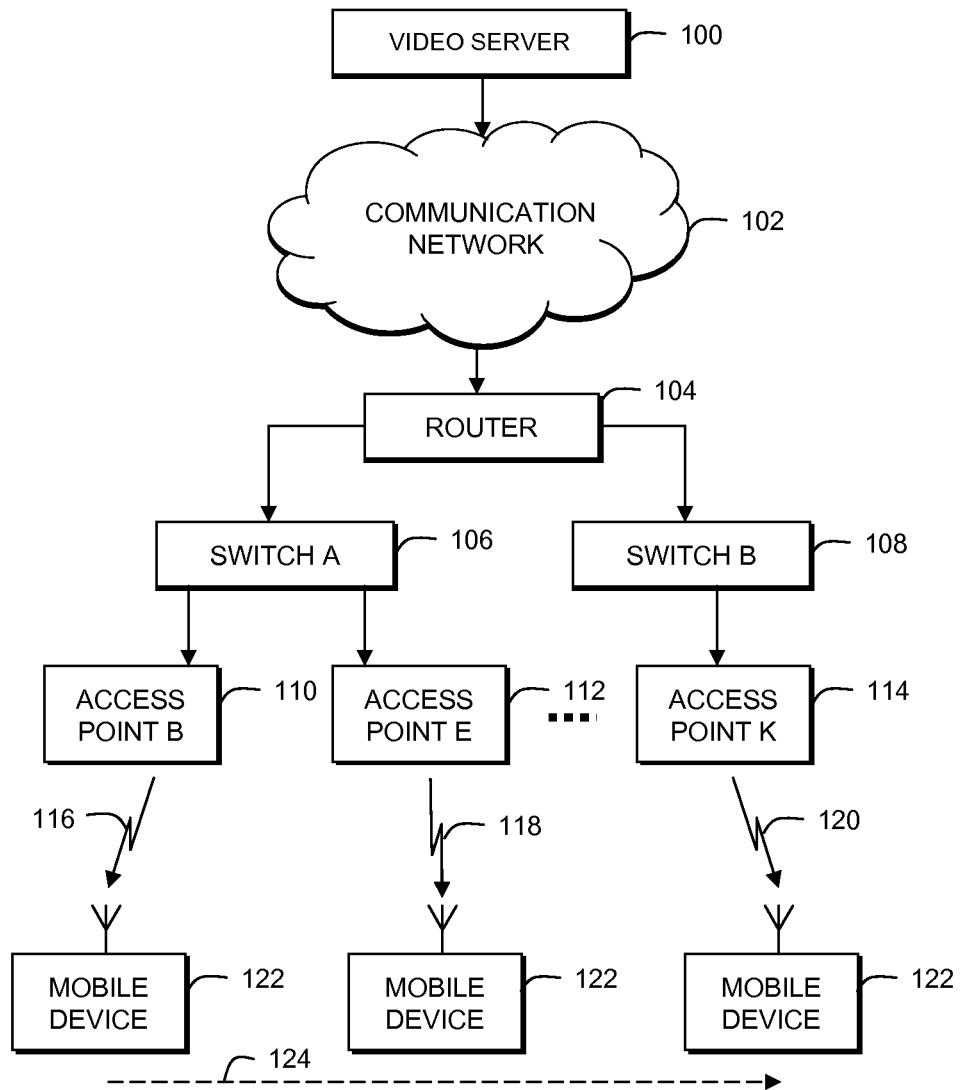
FIG. 1 is a simplified block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system and method is described that provides a video caching technique that provides a good video download experience, while reducing the number of server access requests in order to receive a complete video file. In particular, the present invention, upon a mobile device request for a video file, caches the video in blocks at intermediate access points along a route of the mobile device between a starting point and an ending point. The present invention minimizes the number of server access requests for the video file and accounts for a fair utilization of cache memory across the intermediate access points along the route, by proposing a caching scheme based on a novel bandwidth-cache memory metric. The present invention also proposes a cache clearance policy that is optimized for video data.

FIG. 1 is a block diagram depiction of a system in accordance with the present invention. A plurality of network entities are shown, which can provide video information to a wireless mobile device 122. The network entities can include one or more of a video server 100, a router 104, switches 106, 108, and wireless access points 110, 112, 114, connected in wired and/or wireless configurations. However, it should be recognized that only one network entity (e.g. a wireless video server or an access point) could be used to provide video directly to a mobile device. In practice the video server 100 can be connected to the router 104 through a communication network 102, such as the internet. The router can be coupled to one or more switches 106, 108, wherein the one or more switches control communications with one or more wireless access points 110, 112, 114 defining a wireless local area network (WLAN), for example. The router could even be eliminated. The mobile device 122 can roam 124 within the WLAN, while the one or more switches control communications with the device.

The video file can be downloaded from the video server 100 upon an access request originating from the mobile device. The protocols and messaging needed to accomplish a video transfer, such as in a video-on-demand system, are known in the art, and will not be presented here for the sake of brevity. In addition, the protocols and messaging needed to establish a WLAN are also known in the art and will not be presented here for the sake of brevity.

The wireless communication network can include local and wide-area networks, or other IEEE 802.11 wireless communication system. However, it should be recognized that the present invention is also applicable to other wireless communication systems. For example, the description that follows can apply to one or more communication networks that are IEEE 802.xx-based, employing wireless technologies such as IEEE's 802.11, 802.16, or 802.20, modified to implement embodiments of the present invention.

Referring back to FIG. 1, there is shown a block diagram of various entities adapted to support the inventive concepts of the embodiments of the present invention. Those skilled in the art will recognize that FIG. 1 does not depict all of the equipment necessary for system to operate but only those system components and logical entities particularly relevant to the description of embodiments herein. For example, servers, routers, switches, access points, and mobile devices can all includes separate processors, communication interfaces, transceivers, memories, etc. In general, components such as processors, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Referring back to FIG. 1, a network entity such as a router or one or more switches 104, 106, 108 are operable for video caching in a wireless communication network, in accordance with the present invention. The network entity can include a transceiver under control of a processor as is known in the art. For example, the network entity can be a switch 106, 108 operable to control a wireless local area network incorporating the access points 110, 112, 114. The network entity is aware of the geographic deployment of access points across the area of the communication network. The access points can be configured to support a cache memory, and the access points are operable to report and track their individual streaming capacity and/or bandwidth, available cache memory, and a cache replacement policy, in accordance with the present invention.

The network entity is operable to determine a starting point and an ending point of a path to be taken by a mobile device 122 through the wireless communication network of access points. The starting point of the path can be determined using a known location of the present serving access point or through existing locationing procedures. The ending point of the path can be estimated by one or more of: a direct indication of an ending point by the mobile device, a current vector heading of the mobile device, previous paths traversed by the mobile device, etc. The path includes a service area of a starting access point 110 and a service area of an ending access point 114. The processor is operable to establish a route with a minimum path length between the starting point and the ending point, and identify service areas of intermediate access points along the route, as shown in FIG. 2.

Figure 2:
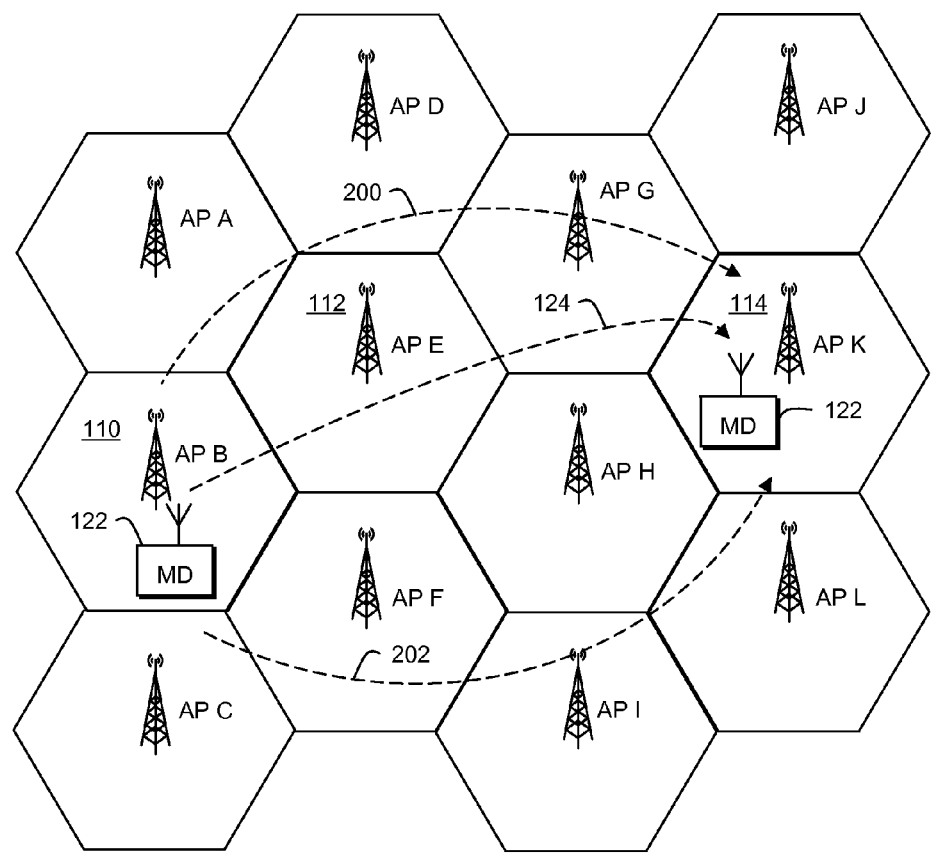
FIG. 2 is an illustration of a network, in accordance with the present invention.

Referring to FIG. 2, a communication network of access points (A through L) is shown. A mobile device 122 can roam within the network. In the example shown, the mobile device 122 can roam from the starting point within the service area of AP B 110 to the ending point within the service area of AP K 114. The mobile device can utilize various routes to roam through the communication network, with three routes 124, 200, 202 shown as a partial example of the possible routes that can be taken.

The network entity evaluates the routes that can be taken by the mobile device in order to determine the physical route having the minimum distance between the starting point and the ending point. This minimum distance route is assumed to be the most likely path of the roaming mobile device 122. In the example shown, one route 200 traverses five AP cells—B, A, D, G, K, whereas another route 202 traverses six AP cells—B, C, F, I, L, K. A minimum distance route 124 is found that only traverses four AP cells—B, E, G, K, and this route is selected as having the minimum physical distance.

The network entity is operable to poll the access points 110, 112, 114 along the route 124 for their respective available bandwidth and amount of cache memory that is already being used out of its total available cache memory. The network entity is then able to determine a streaming capacity of each access point, which is defined as its available bandwidth multiplied with the predicted minimum amount of time that the device will take to transit the service area of the access point. The predicted minimum time can be deduced by considering the geographic location of the access points, and the speed and direction of the mobile device (which can be calculated as is known in the art using various locationing techniques). For example, on route 124, assuming a constant speed, it can be seen that the mobile device will take less time traversing the service are of AP G than that of AP E, since it only transits one side of the service area of AP G instead of going directly through the entire center of the service area as in AP E.

In accordance with the present invention, a metric is defined for each access point (B, E G, K) along the route 124. The metric is defined as the ratio of the available bandwidth at an access point to the amount of used-up cache memory (i.e. amount of cache memory that is already being used out of its total available cache memory). This metric is useful because more video blocks cannot be cached at an access point that has less amount of available cache memory.

The network entity can then list the access points in order of decreasing ratio of available bandwidth to the amount of cache memory that is being used out of the total. In other words, if the access point has a high bandwidth and or is using very little of its available memory then it will have a higher ratio, and is then a better candidate for caching video. The list places those best access point candidates in order.

The network entity then goes down the list in succession and cumulatively adds the streaming capacities of each access point in the list until a total streaming capacity is reached that at least equals the streaming capacity needed to transfer all the blocks of the video file to the mobile device along the route. In effect, the network entity selects those access points having an additive streaming capacity totaling greater or equal to a size of a video file to be downloaded to the mobile device. It should be realized that these selected access points may only be a subset of all the access point along the route 124.

The network entity can then re-order the access points in the list in their order of the physical route being traversed by the roaming mobile device. The network entity will then divide the video file into portions that are sent to the selected access points. A video file is basically a sequential collection of chronological blocks. Therefore, the network entity can then send instructions to each access point to cache a defined number of sequential blocks of the video file such that these blocks can be downloaded from each access points to the mobile device as the mobile device traverses a service area of that access point. The amount of blocks provided for each access point is determined according to its respective streaming capacity and available cache memory. In effect, the instructions operate to divide sequential blocks of the video file among the access points in accordance with their ratio of available streaming capacity to used up cache memory.

As described above, the present invention accounts for fair cache utilization among the access points on the path. Caching in an access point with low bandwidth and a small cache availability and vice versa is not advisable considering the obvious cons of doing so. As a result, the present invention has introduced the metric concept above to address the tradeoff between available bandwidth and cache memory at an access point, in order to provide the best download experience.

Preferably, the network entity is operable to track a path traversed by the mobile device during downloading of the video and make dynamic adjustment to account for the actual path traversed by the mobile device, it speed, and the amount of block actually transferred. The above operations are the result of only one access request by the mobile device. If the mobile device is unable to download the entire video during or after traversing its route, then one or more additional access requests will be required.

A novel aspect of the present invention is the use of "score inheritance" for a defined window size. A score of a video block is defined as the number of times that each particular block has been accessed. For example, it is assumed that for a particular video (such as an instructional video), not all blocks in that video could be accessed equal, i.e. it is presumed that the entire video need not be watched if the viewer is looking for specific segment. A window size is defined from the portion of the number of sequential blocks of the video file that have been assigned to a particular access point, as previously explained. In accordance with the present invention, all of the blocks within the window are assigned (inherit) a score equal to that of the most accessed video block in the window. For example, considering the sequential or chronological order of the video stream, a block next to the high score block has a higher probability of being watched than a block which is further away (chronologically) from the high score block.

Each access point can then stream or cache the video blocks it has. For cached blocks, the access point uses a defined policy for determining how long it will cache the video blocks it has. Those blocks that have a higher score (are accessed the most) can be cached for a longer period in the expectation that they will be accessed more often. As a result the number of cache misses is expected to be far lesser than normal approaches. For example, video blocks that have a lower hit count have a lower probability of being accessed again, reducing the number of cache misses in future accesses, leading to a video download experience that is enriched as download time is minimized.

For example, in a retail environment, videos about popular items may be available to be played in a store to shoppers who are moving through the store. As a shopper moves through the various service areas of access points positioned throughout the store, a selected video can be played in portions, as previously explained above. It needs to be decided which video blocks out of the full video each access point is going to cache and how long it will keep the same. This is determined based on what is popular in the store, what is the most likely segment that each access point can stream. Simplistically speaking, an access point at the entrance of the store probably will have first few blocks of most videos, the access points in the middle/aisles of the store have mid-segments of the video, etc. In the present invention, a given access point will cache the most likely video segment that a shopper is going to watch before the shopper enters the service area of that access point, so that when the shopper enters the access point service area the correct video segment is delivered to the shopper based on the temporal sequence of the video segments. Cached video blocks are replaced dependent on their score. Less popular (lower scored) video blocks will be cached for a shorter period of time than more popular (higher scored) video blocks.

The cache clearance policy of the present invention is based on inherent temporal properties of video. Unlike caching content such as web pages, video content consists of related blocks which are consumed and rendered in a chronological order. The cache clearance policy exploits the chronological ordering of blocks. In one embodiment, the longest contiguous sub-sequence of blocks belonging to the same video inherits a score which is a function of the scores of the individual blocks of this sequence, as defined above. In an alternate embodiment, blocks belonging to a particular video inherit the same hit score or timeout value if they are found to be present in a chronological order. In yet another alternate embodiment, the longest sub-sequence of blocks is defined by a time-ordered window size.

The caching policy of the present invention intends to use the most dependable access point on the route rather than all the access points on the route, so as to augment the prospect of streaming the whole video to mobile devices without missing any blocks or segments. This improves the optimality of the use of the cache of the access points which can also be viewed as a distributed cache. This provides us both the optimal utilization of cache memory and the dependability of streaming the whole video without missing any blocks or segments. In effect, a 'cost' and 'profit' metric was developed in terms of the functionality and characteristics of the access point under consideration. The 'profit' earned for using an access point depends on its bandwidth which helps to stream the video in a lesser time period that an access point with a lower bandwidth. The 'cost' metric is going to be the amount of used up cache because an access point with a low cache availability cannot cache a large portion of a video and hence proves costly for caching.

The access points on the route to the destination are sorted on the profit/cost metric and the highest ranking nodes are filled with video blocks, one after the other, until the video file is completely streamed/cached. Deciding how much video to cache and how much to stream is based on the streaming capacity of an access point. The streaming capacity of an access point is equal to the product of the amount of time a mobile device traverses a serving area of an access point and the available bandwidth of the Access point, meaning a portion of the video equal to the above product can be streamed through the access point under consideration. In an ideal situation, the access point should have available cache memory equal to it's streaming capacity. But in any other case, where the available cache memory is less that the streaming capacity, the present invention streams and caches only as much of the portion of the video as there is available cache memory in an access point and move to the next access point in the order of the profit/cost metric. If the cache is completely filled up, video blocks are replaced in accordance with their score so as to maintain the blocks which are in frequent demand.

Figure 3:
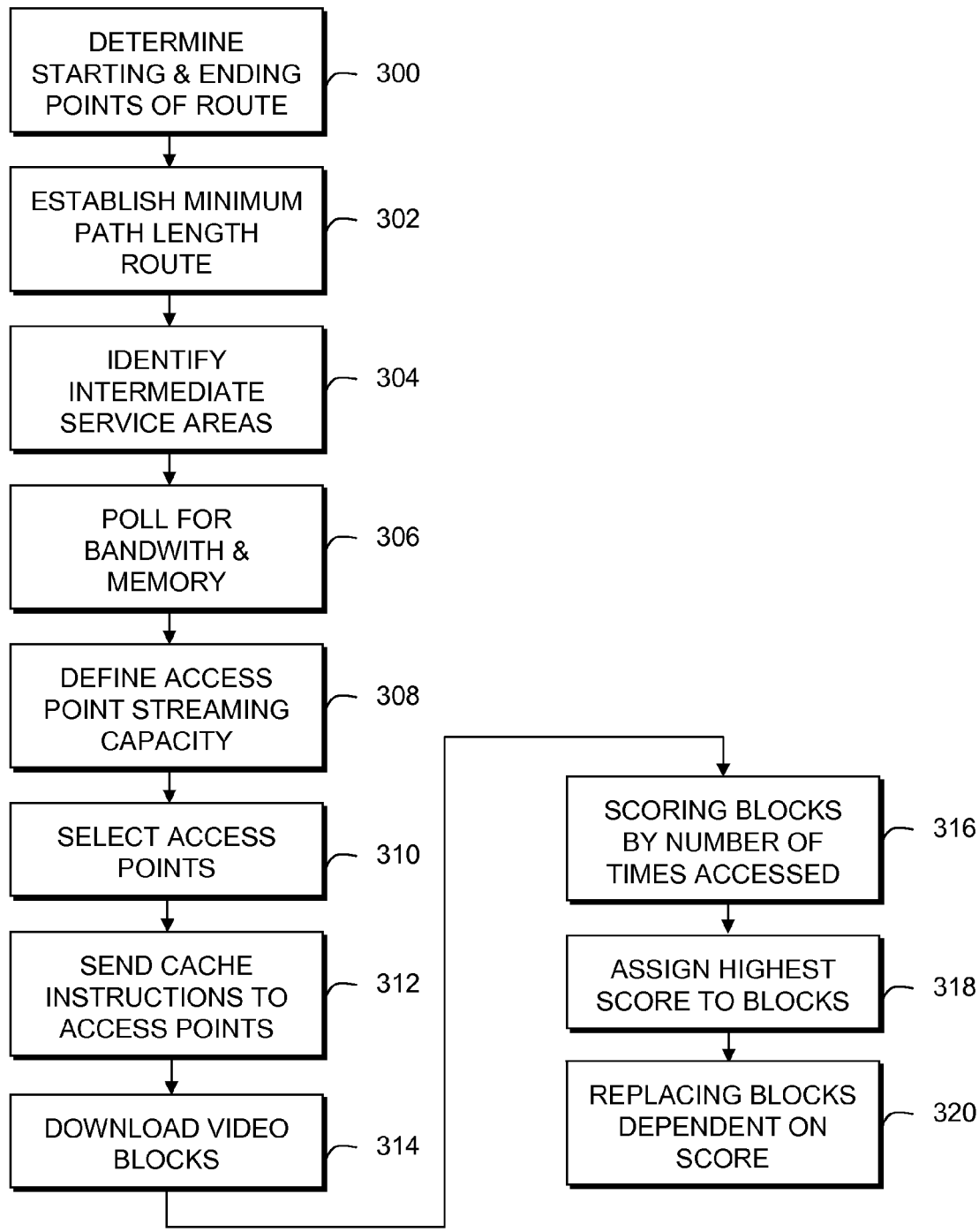
FIG. 3 is a flowchart of a method, in accordance with some embodiments of the present invention.

FIG. 3 illustrates a flowchart of a method for video caching in a wireless communication network, in accordance with the present invention. The method includes determining 300 a starting point and an ending point of a path to be taken by a mobile device through a wireless local area network of access points, the path including a service area of a starting access point and a service area of an ending access point.

A next step includes establishing 302 a route with a minimum path length between the starting point and the ending point. This step can also include tracking a path traversed by the mobile device during downloading of the video.

A next step includes identifying 304 service areas of intermediate access points along the route.

A next step includes polling 306 the access points along the route for their respective available bandwidth and amount of cache memory that is already being used out of its total available cache memory.

A next step includes defining 308 a streaming capacity of each access point. In particular, the streaming capacity of each access point equals its available bandwidth times a predicted amount of time that the mobile device will spend traversing the service area of that access point along the route.

A next step includes selecting 310 those access points having an additive streaming capacity that totals greater or equal to a size of a video file to be downloaded to the mobile device. In particular, this step includes listing the access points in order of decreasing ratio of available bandwidth to the amount of cache memory that is already being used out of its total available cache memory, and adding the streaming capacities of each access point in the list in succession until the additive streaming capacity totals greater or equal to a size of a video file to be downloaded to the mobile device. The selected access points in the total are then ordered according to their locations on the route.

A next step includes sending 312 instructions to each access point from the selecting step to cache a defined number of sequential blocks of the video file. These instructions divide sequential blocks of the video file among the access points of the selecting step 310 in accordance with; their location on the route, their available streaming capacity, and their available cache memory.

A next step includes downloading 314 the blocks from each access point to the mobile device as the mobile device traverses a service area of that access point.

In a further embodiment, the access points of the selecting step (310) each receive a portion of the video file, and further comprising scoring (316) each block in the portion in accordance to a number of times that each block has been accessed, and assigning (318) a score to all blocks in the portion equal to that of the most accessed video block in the portion. Blocks can then be replaced by replacing (320) cached video blocks dependent on their score, wherein higher scored blocks are cached longer than lower scored block.

Advantageously, the system and method described herein uses a novel capacity metric and prior knowledge of the path traversed while video download takes place to minimize video download time. The present invention would reduce the number of Server Accesses for Video Blocks while considering potential path traversed during Video Download. The present invention can also keep track of the path traversed during video download to use in enhancing the video download experience. The present invention also introduces the concept of cache clearance while accounting for the inherent temporal property of video data. As a result the number of cache misses is expected to be far lesser than prior art approaches. Hence video download experience is enriched as download time is minimized.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for video caching in a wireless communication network, the method comprising:
   determining a starting point and an ending point of a path to be taken by a mobile device through a wireless local area network of access points, the path including a service area of a starting access point and a service area of an ending access point;
   establishing a route with a minimum path length between the starting point and the ending point;
   identifying service areas of intermediate access points along the route;
   polling the access points along the route for their respective available bandwidth and amount of cache memory that is already being used out of its total available cache memory;
   defining a streaming capacity of each access point;
   selecting those access points having an additive streaming capacity that totals greater or equal to a size of a video file to be downloaded to the mobile device, wherein selecting includes listing the access points in order of decreasing ratio of available bandwidth to the amount of cache memory that is already being used out of its total available cache memory, and adding the streaming capacities of each access point in the list in succession until the additive streaming capacity totals greater or equal to a size of a video file to be downloaded to the mobile device;
   sending instructions to each selected access point to cache a defined number of sequential blocks of the video file; and
   downloading the blocks from each selected access point to the mobile device as the mobile device traverses a service area of that selected access point.

2. The method of claim 1, wherein establishing includes tracking a path traversed by the mobile device during downloading of the video.

3. The method of claim 1, wherein selecting includes ordering the selected access points in the total according to their locations on the route.

4. The method of claim 1, wherein in the defining step the streaming capacity of each access point equals its available bandwidth times a predicted amount of time that the mobile device will spend traversing the service area of that access point along the route.

5. The method of claim 1, wherein the instructions in the sending step divide sequential blocks of the video file among the selected access points in accordance with their location on the route and their ratio of available streaming capacity to their amount of cache memory that is already being used out of its total available cache memory.

6. The method of claim 5, wherein the selected access points each receive a portion of the video file, and further comprising:
   scoring each block in the portion in accordance to a number of times that each block has been accessed, and
   assigning a score to all blocks in the portion equal to that of the most accessed video block in the portion.

7. The method of claim 6, further comprising replacing cached video blocks dependent on their score, wherein higher scored blocks are cached longer than lower scored block.

8. A network entity operable for video caching in a wireless communication network, the network entity comprising:
   a transceiver; and
   a processor coupled to the transceiver, the processor operable to determine a starting point and an ending point of a path to be taken by a mobile device through the wireless communication network of access points, the path including a service area of a starting access point and a service area of an ending access point, the processor operable to establish a route with a minimum path length between the starting point and the ending point, and identify service areas of intermediate access points along the route, the processor operable to poll the access points along the route for their respective available bandwidth and amount of cache memory that is already being used out of its total available cache memory, and define a streaming capacity of each access point, wherein the processor selects those access points having an additive streaming capacity totaling greater or equal to a size of a video file to be downloaded to the mobile device by listing the access points in order of decreasing ratio of available bandwidth to the amount of cache memory that is already being used out of its total available cache memory and adding the streaming capacities of each access point in the list in succession until the additive streaming capacity totals greater or equal to a size of a video file to be downloaded to the mobile device, the processor directs the transceiver to send instructions to each selected access point to cache a defined number of sequential blocks of the video file such that these blocks can be downloaded from each selected access point as the mobile device traverses a service area of that selected access point.

9. The entity of claim 8, wherein the entity is a switch operable to control a wireless local area network incorporating the access points.

10. The entity of claim 8, wherein the processor is operable to track a path traversed by the mobile device during downloading of the video.

11. The entity of claim 8, wherein the processor is operable to order the selected access points in the total according to their locations on the route.

12. The entity of claim 8, wherein the instructions operate to divide sequential blocks of the video file among the selected access points in accordance with their available streaming capacity to their available cache memory.

13. The entity of claim 8, wherein the streaming capacity of each access point equals its available bandwidth times a predicted amount of time that the mobile device will spend traversing the service area of that access point along the route.

14. The entity of claim 8, wherein the selected access points each receive a portion of the video file, and wherein the processor scores each block in the portion in accordance to a number of times that each block has been accessed, and assigns a score to all blocks in the portion equal to that of the most accessed video block in the portion.

15. The entity of claim 14, wherein the selected access points replace cached video blocks dependent on their score, wherein higher scored blocks are cached longer than lower scored block.

* * * * *